Feb. 24, 1970    D. L. WENHAM    3,496,905
MILK FLOW INDICATOR

Filed July 6, 1967    2 Sheets-Sheet 1

INVENTOR
DOUGLAS LEE WENHAM
BY
ATTORNEYS

Feb. 24, 1970   D. L. WENHAM   3,496,905
MILK FLOW INDICATOR
Filed July 6, 1967   2 Sheets-Sheet 2

INVENTOR
DOUGLAS LEE WENHAM
BY
Owen, Wickersham & Erickson
ATTORNEYS

United States Patent Office 3,496,905
Patented Feb. 24, 1970

3,496,905
MILK FLOW INDICATOR
Douglas Lee Wenham, Hamilton, North Island, New Zealand, assignor to Plastic Products Limited, Hamilton, North Island, New Zealand, a corporation of New Zealand
Filed July 6, 1967, Ser. No. 651,505
Int. Cl. G01f 15/00
U.S. Cl. 116—117    10 Claims

ABSTRACT OF THE DISCLOSURE

This disclosure relates to a device for indicating when the rate of milk flow has fallen below a predetermined level during a milking operation. The device comprises a chamber having at its upper end a dome member forming a concave inner surface with a circular rim. Directly below this surface and centrally aligned with it is an inlet which is connected to a milking machine and thus impinges pulsating charges of milk against the concave surface. The milk on the surface flows in a uniform film and drops as a circular curtain from the surface rim. A portion of this curtain of milk is diverted to a gallery from which milk can flow through a restricted outlet at no higher than a predetermined rate. When the flow of milk is above the normal predetermined rate, the milk diverted to the gallery which cannot escape through its outlet is directed to a viewing chamber. Thus, milk in the viewing chamber indicates that an above minimum flow condition exists.

---

The invention relates to milk flow indicators.

An object of the invention is to provide an indicator which will indicate the rate of milking.

It is desirable that the device will show precisely when the rate of milk flow has fallen below a predetermined level, for instance about ½ pound milk per minute, thus avoiding the troubles caused by overmilking or losses due to undermilking.

It is also desirable that the device has a construction enabling it to be washed effectively in situ by normal milking machine washing procedure, thus making it unnecessary to dismantle the device. It is further desirable that the device offers very low resistance to milk flow so that there is no noticeable effect on the milking rate.

It is also desirable that the device will indicate the rate of flow of milk by utilizing only a small portion of the main flow of milk through the indicator.

Further desirable advantages of the device are that it will give a reliable indication of milk flow, irrespective of variations or fluctuations in vacuum or air conditions and that it will be free from mechanical complications, has no small jet holes which are apt to become blocked and are difficult to clean, and is composed of a relatively few simple parts that can easily be manufactured, assembled and, if necessary dismantled.

The milk flow indicator of the present invention comprises a base plate, a cap or cover of rigid transparent material mounted on the base plate and shaped to provide a chamber between the cap and the base plate; an inlet nozzle projecting into the chamber with the lower end of the nozzle being adapted for connection to the dropper or section of milk tube extending from the milk cups or milk cup claw; an outlet from the chamber adapted to be connected to the section of milk line extending to the releaser of the milking machine; a viewing chamber formed within the cap; means to divert the milk flowing through the inlet nozzle into a gallery, means to divert a portion of the milk within the gallery into a separate compartment; means to enable such diverted flow of milk within the separate compartment when less than a predetermined rate, to pass entirely to the outlet of the chamber and means to enable the excess of such diverted milk within the compartment when the flow of milk is greater than the predetermined rate to pass into the viewing chamber; the constructions and arrangement being that during a milking operation, the milk which enters the chamber through the inlet nozzle will fall into and fill the gallery, a portion of the milk being diverted, with the remainder of the milk spilling out of the gallery and so into the outlet of the chamber, while the diverted portion of milk will, when the rate of flow exceeds a predetermined rate, pass into the viewing chamber.

The milk flow indicator of the present invention may incorporate the features of construction constituting the milk yield indicator described and claimed in my co-pending United States patent application, Ser. No. 651,623, filed July 6, 1967. this combination thus providing a device which is usable as both a milk flow indicator and a milk yield indicator.

A particular embodiment of the device is illustrated in the accompanying drawings, in which.

Figure 1:
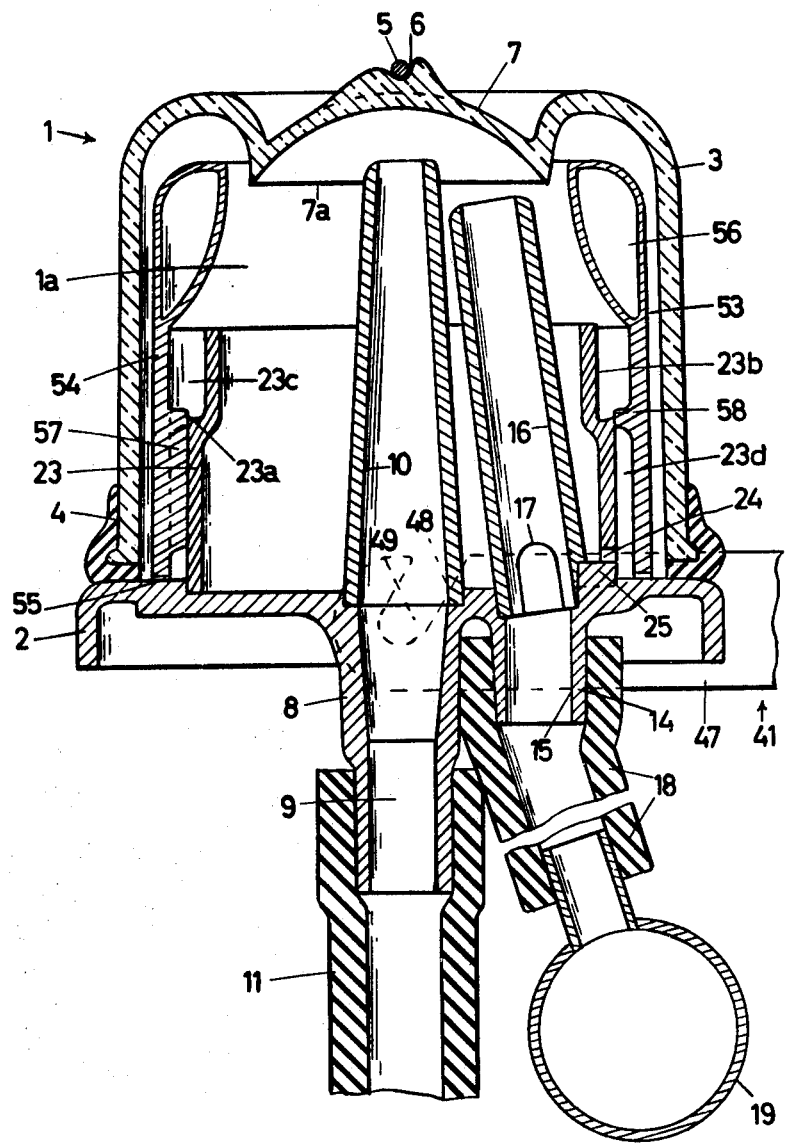
FIG. 1 is a vertical sectional view of the complete device.

As shown, the device comprises a head portion generally indicated at 1, this portion including a horizontally disposed circular base plate 2 having an upper face of recessed form, the raised marginal part of the base plate being surmounted by a cap 3. The cap is of inverted cup-like shape, a chamber is thus formed between the cap and the base plate. The lower edge of the cap 3 is fitted with a sealing ring 4 of rubber or other suitable resilient material which seats on the marginal part of the base plate 2 to provide a leakproof joint between the cap and base plate, the cap is held on the base plate by means of a releasable spring clip or yoke member 5 which is pivotally connected to the base plate and engages in a centrally disposed depression 6 (FIG. 1) formed in the outer face of the closed upper end of the cap.

The cap 3 is made from a rigid transparent material, and its closed upper end is shaped to provide a centrally disposed dome 7, the concave face of which faces downwardly so that it lies within the chamber 1a, the said face being in the form of part of a sphere so that it is of regular uniform curvature in all of its cross sections. Instead of the concave face of the dome 7 conforming to the shape of part of a sphere as just mentioned, this face may be of parabolic or other curved shape so long as it is uniform in all cross sections.

The base plate 2 is formed with a centrally positioned and downwardly projecting spigot 8 through which a vertically disposed hole 9 is formed. Around the upper end of this hole there is secured an upwardly extending inlet nozzle 10 which lies within the chamber 1a, the axis of which is in alignment with the axis of the concave face of the dome 7. The inlet nozzle is tapered in the direction of its upper end, this end being spaced below the concave face of the dome. To the lower end of the spigot 8 there is connected the upper end of a depending length of hose 11 for connection to the milk cup claw (not shown) of the milking machine.

The base plate 2 of the head portion 1 of the device is formed with a second downwardly extending spigot 14 which is radially offset from the spigot 8 and is formed with a vertically extending hole 15 which opens at the upper face of the base plate and within the confines of the cap 3. Around the upper end of this hole there is secured an outlet tube 16 which extends upwardly into the chamber 1a and the upper end of which terminates below the upper end of the inlet nozzle 10. A slot or slots 17 are formed in the lower part of the side wall of the outlet tube 16, each slot providing an opening which places the lower part of the chamber 1a in communication with the bore of the outlet tube 16. To the lower end of the spigot 14 there is adapted to be secured one end of a length of hose 18, the other end of which is connected to the milk line 19 leading to the releaser (not shown) of the milking machine.

An endless wall member 23 is fixed to the upper face of the base plate 2. The upper part 23b of the outer surface of the wall member 23 is of reduced diameter to form thereby an external shoulder indicated at 23a. The wall member 23 surrounds the inlet nozzle 10 and outlet tube 16, and is thus spaced inwardly of and concentric with the inside wall of the cap 3. The wall member 23 is correctly located on the base plate 2 by the provision in the lower edge of the wall member 23, of a slot 24 which engages over a key 25 formed on and projecting upwardly from the upper face of the base plate 2. The slot 24 is made of a greater height than the key 25, thus providing an orifice for a purpose to be hereinafter described. The orifice represented by the upper portion of the slot 24 is of smaller area than that of the opening formed by the slot 17 in the outlet tube 16.

For a purpose to be described, a generally cylindrical baffle 54 is engaged in the chamber 1a between the wall member 23 and the cap 3 so as to provide a viewing chamber 53. The lower edge of the baffle 54 rests on the upper face of the base plate 2 and is formed with small serrations or protrusions 55, the gaps in which act to place the viewing chamber 53 in communication with the interior of the baffle. The upper part of the baffle extends above the upper edge of the wall member 23 in the form of a float 56. The baffle, while normally resting on the base plate 2 is free to move upwardly within the cap 3 and thus relatively to the cylindrical wall member 23. During its upward and downward movements the baffle is guided by a series of vertically disposed ribs 57 which bear, with a working clearance, against the outside face of the lower part of the wall member 23. A circular beading 58 is formed on the inner face of the baffle 54, the beading being so positioned that while the baffle remains resting on the base plate 2, the beading will lie opposite to and extend around the shoulder 23a on the wall member 23 as shown in FIG. 1. The internal diameter of the beading 58 is such that a narrow annular gap, for instance .025", is left between its inner edge and the outer edge of the shoulder 23a. It will thus be understood that below the beading 58, between the wall member 23 and baffle 54 there is provided an annular space 23d to form a relatively calm pool of milk as will be hereinafter described.

Figure 2:
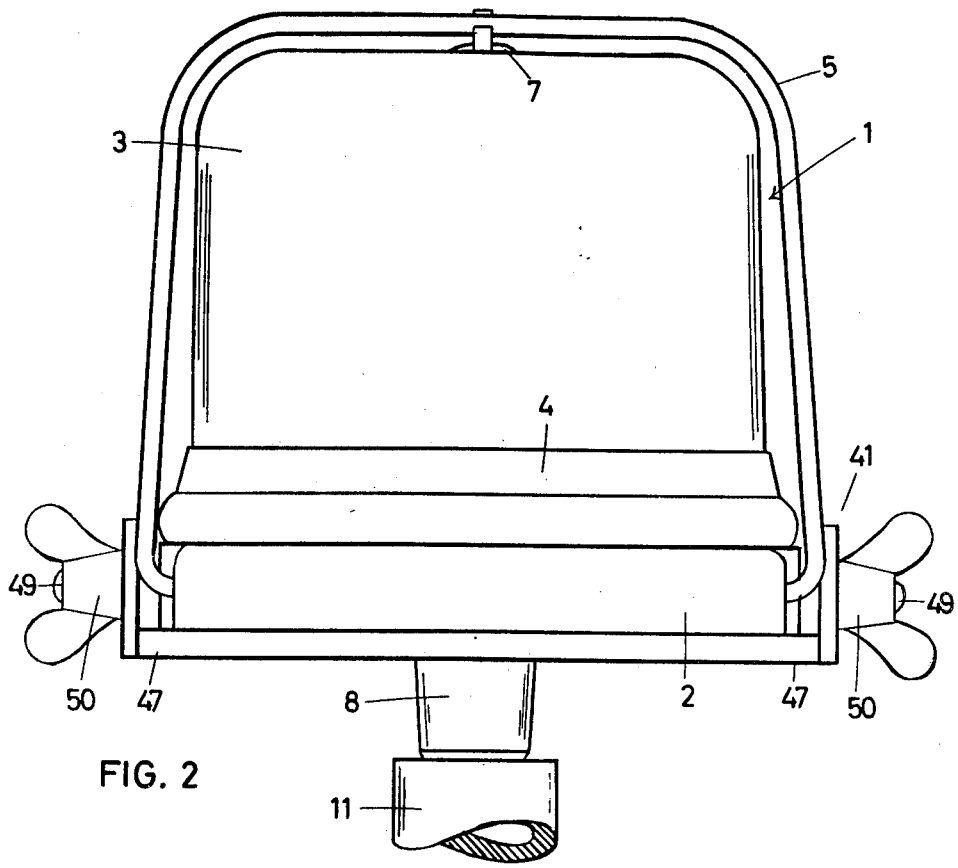
FIG. 2 is a front elevational view of the device.
Figure 3:
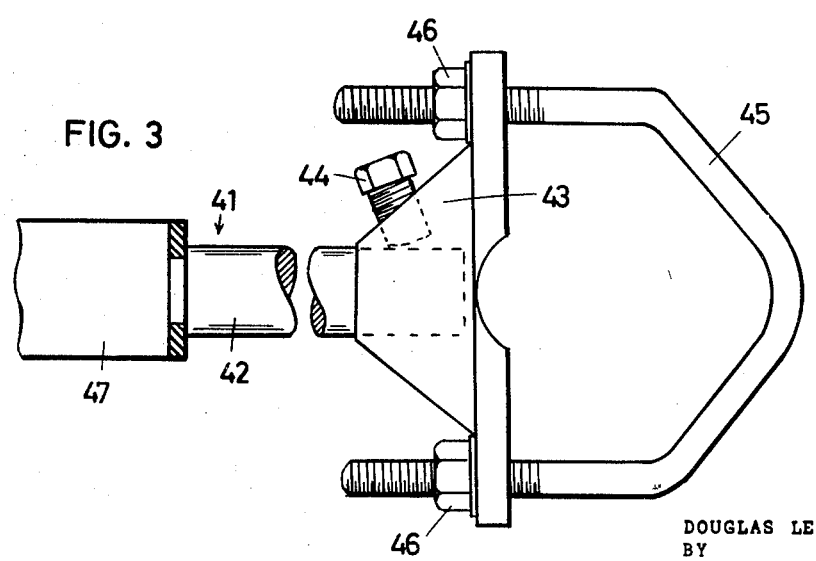
FIG. 3 is a side elevational view of part of supporting means for the device.

The device as a whole is suspended in a convenient position in the milking shed by means of a bracket generally indicated at 41 in FIGS. 1, 2 and 5. In the embodiment illustrated the bracket is so constructed that the device is adjustable for distance from the support to which the bracket is secured and also for levelling the head portion 1. To this end, the bracket includes a stem 42 (FIG. 5) one end portion of which is engaged slidably and rotatably in a hole in a plate 43, the stem being locked to the plate by means of a set screw 44. The plate 43 is fitted with a shackle-bolt 45 having screw-threaded ends to which nuts 46 are applied, this arrangement enabling the bracket to be clamped to a rail or post in the milking shed. To the other end of the stem 42, there is secured a bifurcated member, the arms 47 of which straddle the head portion 1 of the device and are formed with slots 48 (FIG. 1) in which engage screw-threaded studs 49 projecting in opposite radial directions from the base plate 2, the studs being fitted with wing nuts 50 (FIG. 2) for locking the device firmly to the arms 47.

Where a wall of the milking shed forms a convenient fixture for the bracket 41, the shackle-bolt 45 and its nuts 46 are dispensed with, the plate 43 then being fastened to the wall by passing screws or bolts through the holes left in the plate as a result of removal of the shackle bolt 45.

When the device has been connected up to the milk cup claw by means of the tubing 11 and to the milk line 19 by means of the hose 18, indications of the rate of flow of milk from the cow during milking are obtained as follows: The inflations forming part of the milk cup claw are applied to the teats of the animal. Each pulsation of the milking machine will cause a jet of milk and air to rise through the inlet nozzle 10 and issue from the upper end of the nozzle. The part of the issuing jet that is represented by air and milk froth will be drawn out of the chamber 1a through the outlet tube 16 and thus becomes separated from the milk itself, the air and milk froth then passing into the milk line 19 under the suction effect of the vacuum pump of the milking machine. The remaining part of the issuing jet, represented by milk, will impinge on the center part of the concave face of the dome 7 and become spread as a film over this face. When the milk film reaches the rim 7a of the concave face of the dome 7, it will descend as an annular curtain from the rim. The descending curtain of milk will fall into the gallery 23c formed by the upper portion of the wall member 23 and the inside wall of the baffle 54. A small portion of the milk in the gallery 23c is forced by the kinetic energy of the falling milk curtain through the narrow annular gap between the wall member 23 and the beading 58 of the baffle 54 and commences to fill the annular space between the baffle 54 and wall member 23. The milk in the annular space will flow through the orifice 24 and the chamber 1a and thence through slots 17 and so to the milk line 19. Provided the rate of flow is less than a predetermined quantity, for instance, about ½ pound per minute, all the milk within the said annular space will flow through the orifice 24. When the rate of flow exceeds this quantity, the excess milk in the annular space is forced through the gaps between the serrations 55 and into the viewing chamber 53. The level of milk within the viewing chamber 53 will thus depend upon the rate of flow of milk through the indicator. As before mentioned, only a small portion of milk passes the annular gap. The main body of milk in the descending curtain which enters the gallery 23c after such gallery is filled, will spill over into the chamber 1a and pass through the slot 17 and thus into the milk line 19.

When the milk flow from the cow has fallen below the predetermined level the quantity of milk supplied from the curtain to the gallery 23c will be less than the quantity of milk escaping from the annular space between the baffle 54 and wall member 23 through the orifice 24. This will enable the milk within the viewing chamber 53 to pass also through the orifice 24 so that the level of milk within this compartment will fall. The visible variations in level in the viewing chamber 53 are therefore proportional to the variations in flow of milk from the cow.

When the viewing chamber 53 has become visibly empty of milk it will be known that the milking operation should be brought to an end.

The cap 3 may be marked with graduations to give an indication of the rate of flow of the milk from the cow, the rate index being, say, in pounds avoirdupois or kilograms per minute.

The baffle 54, with its serrations 55 and beading 58, has for its primary purpose to act as a froth tap which practically prevents any froth from entering the viewing chamber. The milk and froth fall into the gallery 23c and the liquid part of the milk will then pass down through the gap between the shoulder 23a and beading 58, into the annular space between the baffle 54 and the wall member 27. Because of the restriction given by the annular gap the milk in the annular space will be relatively calm and free from froth since the larger bubbles in the froth will be held back by the shoulder and upper edge of the beading. The smaller bubbles passing with the liquid milk through the aforesaid gap and into the viewing chamber 53, will meet the gaps made by the small serrations in the lower edge of the baffle 54 and be held back by the baffle, thus leaving the liquid milk alone to pass through the gaps in the serrations and into the viewing chamber. In result, the actual level of the milk reaching the viewing chamber will be sharply defined and not made uncertain as it would be if it were frothy, thus making it easy to follow the rising and falling movement of the milk in this section and, if necessary, taking readings, by observation through the side wall of the cap 3.

Under the influence of the pulsator of the milking machine the milk and air coming through the tubing 11 and inlet nozzle 10 will be supplied to the chamber 1a in the form of pulsations. The baffle 54 and its associated parts, besides acting as a froth trap, will also minimize the pulsations from being transmitted to the part of the milk that reaches the viewing chamber 53. Thus, the level of the milk in this viewing chamber will rise and fall steadily and not in jerks, thereby making it even easier to ascertain the exact level at any time by observation through the cap 3.

The interior of the device when constructed as described and illustrated can, when desired, be washed in situ by normal washing systems and without dismantling. For this purpose the milk cup claw may be immersed in a supply of washing liquid. Operation of the milking machine will then cause the washing liquid to follow the same courses through the meter as those followed by the milk during a preceding milking operation.

As washing liquid can be supplied to the chamber 1a more freely than milk drawn from a cow, the washing operation can be carried out in such manner that the rate of flow of the liquid into the chamber 1a from the inlet nozzle 10 will be greater than the rate of flow of the liquid out of the chamber through the slot 17 in the outlet tube 16, thus making it possible to flood the chamber and thereby promote a thorough cleaning effect. As such flooding occurs, the float 56 will act to lift the baffle 54, thus raising the lower edge of the baffle completely clear of the base plate 2 and the beading 58 clear of the shoulder 23a on the wall member 23. The constricting effect produced by the small gaps between the serrations 55 in the lower edge of the baffle 54 and by the beading 58 when the baffle is in its normal resting position will thus be removed, permitting a turbulent flow of cleaning liquid through the viewing chamber 53 as well as through the rest of the chamber 1a and the other parts lying within it.

As before mentioned, the cap 1 is held on the base 2 by a releasable spring clip 5. This clip is arranged so that the cap is not held in compression on the base, but is a loose fit thereon. During milking the vacuum which will obtain in the indicator, results in the cap becoming firmly sealed on the base, such sealing being assisted by the sealing ring 4 which prevents the ingress of air into the interior of the indicator. During the normal washing procedure, since the interior of the indicator is still under reduced pressure the seal between the cap and the base is maintained. When the washing has been completed and the vacuum removed the seal will be broken so that any washing fluid remaining in the bottom of the viewing chamber will flow under the sealing ring and out over the circular base plate 2. The loose fit of the cap on the base will enable air to enter the interior of the indicator during non-use and so assist in the aeration thereof.

As before mentioned when the rate of flow of milk passing through the indicator is below a predetermined level, all the milk flowing past the annular gap between the wall member 23 and the beading 58 will flow through the orifice 24 and so back into the milk line 19. Since the indicator is designed to indicate a flow of milk only in excess of such a rate, the sealing ring 4 preferably extends part way up the side of the cap 3 so that only when the level of milk in the viewing chamber rises above the top of the sealing ring will the milk be visible.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. For application to a milking machine, a milk flow indicator comprising a base plate, an inverted cup-shaped cap of rigid transparent material mounted on said base plate and providing a chamber between the cap and the base plate, said cap having means forming an inner concave face at its upper end; a nozzle having an inlet at its upper end located within and spaced from said concave face of said chamber and a lower end on said nozzle extending below said base plate and adapted for connection to the dropper or section of a milk tube extending from the milk cups or milk cup claw of a milking machine; said chamber having an outlet adapted to be connected to a milk line extending to the releaser of the milking machine; baffle means within said cap providing a viewing chamber and surrounding said nozzle; means on said baffle means to divert the milk flowing through the inlet nozzle into means adjacent said baffle means forming a gallery and a separate compartment adjacent said gallery, means to divert a portion of the milk within said gallery into said separate compartment; means to enable such diverted flow of milk within said separate compartment when less than a predetermined rate, to pass entirely to the outlet of said chamber and means to enable the excess of such diverted milk within said compartment when the flow of milk is greater than the predetermined rate to pass into said viewing chamber; whereby during a milking operation, milk entering said chamber through said inlet nozzle falls into and fills said gallery, a portion of the milk being diverted, with the remainder of the milk spilling out of said gallery and so into the outlet of said chamber, while the diverted portion of milk will, when the rate of flow exceeds a predetermined rate, pass into said viewing chamber.

2. The milk flow indicator as claimed in claim 1 said means to divert a portion of the milk within the gallery into a separate compartment comprises an endless wall member fixed to the base plate and lying within the said chamber, said baffle means surrounding the wall member having a beading formed on the interior thereof and spaced from the wall member to form an annular gap; said wall member and said baffle means being shaped to provide the gallery at the base of which is the annular gap, so that a portion of the milk within the gallery can pass through the annular gap into a separate compartment below the annular gap, said separate compartment being in the form of an annular space positioned below the beading and between the said baffle means and wall member.

3. The milk flow indicator as claimed in claim 2, wherein at least one orifice is formed through the lower part of said endless wall member so as to place the annular space in communication with the interior of the endless wall member, to enable milk which enters the annular space to flow through the said orifice or orifices into the interior of the chamber and so into the outlet thereof, and wherein the size of the orifice or orifices is arranged so that when below a predetermined rate of flow all the milk within the annular space can pass through the said orifice or orifices.

4. The milk flow indicator as described in claim 1 wherein said viewing chamber is formed by means of a compartment between the interior of the cap and the exterior of said baffle means and wherein the baffle means rests on said base plate, but has a restricted entry at its bottom so that milk can pass in a restricted flow between the baffle and the base plate and into the viewing chamber.

5. The milk flow indicator as claimed in claim 4, wherein the restricted entry to said viewing chamber is formed by a series of gaps formed on the end of said baffle means at the point of contact of the baffle means with the said base plate.

6. The milk flow indicator as described in claim 1 wherein the interior of said cap is provided at its upper end with a dome forming said concave face which faces downwardly, and wherein said inlet nozzle extends upwardly from said base plate so that it projects into said chamber and lies in line with the axis of said concave face of said dome, the upper end of the nozzle being spaced from the said concave face, whereby milk which entering the inlet nozzle will be forced upwardly against the dome of the cap and from there will fall downwardly into the said gallery.

7. The milk flow indicator as described in claim 1 wherein the outlet of said chamber comprises a tube extending upwardly from said base plate having an open upper end near the upper end of said nozzle and a bore in communication with its open end with an opening formed therein near the lower end of said tube in communication with the lower part of the said chamber near said base plate.

8. The milk flow indicator as described in claim 5 including means for raising said baffle from its normal rest position so that the lower edge of the baffle is raised clear of the base plate and so that the annular beading within said baffle is raised clear of the annular shoulder on the wall member, in order that cleaning fluid may be flushed through the indicator and said baffle be raised to allow a flow of the cleaning fluid to pass through said viewing chamber.

9. The milk flow indicator as claimed in claim 8, wherein the means for raising said baffle comprises a float formed on the upper part of the baffle.

10. A milk flow indicator in accordance with claim 1 including means on said base plate for adjustably supporting it in a convenient position in a milking shed.

References Cited

UNITED STATES PATENTS

| | | | |
|---|---|---|---|
| 1,264,214 | 4/1918 | Shippert | 119—14.16 |
| 1,983,231 | 12/1934 | Keitel | 116—117 XR |
| 2,513,627 | 7/1950 | Dinesen | 116—117 XR |
| 3,241,372 | 3/1966 | Maxwell. | |
| 3,349,617 | 10/1967 | Hartstone | 73—202 |

FOREIGN PATENTS

| | | |
|---|---|---|
| 151,025 | 4/1953 | Australia. |
| 280,634 | 3/1966 | Australia. |
| 582,991 | 12/1946 | Great Britain. |

LOUIS J. CAPOZI, Primary Examiner

U.S. Cl. X.R.

119—14.16